United States Patent [19]

Mathunaga

[11] Patent Number: 4,731,779
[45] Date of Patent: Mar. 15, 1988

[54] DISK INSTALLING DEVICE FOR A DISK PLAYER

[75] Inventor: Tathuhisa Mathunaga, Fujisawa, Japan

[73] Assignee: Hitachi, Ltd., Tokyo, Japan

[21] Appl. No.: 893,866

[22] Filed: Aug. 6, 1986

[30] Foreign Application Priority Data

Aug. 21, 1985 [JP] Japan .................................. 60-181798

[51] Int. Cl.⁴ ......................... G11B 25/04; G11B 17/02
[52] U.S. Cl. ........................................ 369/270; 360/99
[58] Field of Search ...................... 369/270, 271, 77.1, 369/75.2; 360/99

[56] References Cited

U.S. PATENT DOCUMENTS 3,867,724  2/1975  Bruer et al. .......................... 369/270
4,232,870  11/1980  Iemenschot .......................... 369/270

Primary Examiner—Steven L. Stephan
Attorney, Agent, or Firm—Antonelli, Terry & Wands

[57] ABSTRACT

A disk installing device for a disk player comprises a centering hub (4) both for centering a video disk (15) and for centering a compact disk (20) having a center hole having a diameter smaller than that of the video disk (15), and a turn table (3) for supporting and rotating the video disk (15) or the compact disk (20). The centering hub (4) has three taper walls (6) formed in the outer circumference thereof at regular angular intervals for centering the video disk (15) and a taper boss (5) for centering the compact disk (20), and is axially slidably attached to the output shaft of a driving motor (1). The turn table (3) is fixed to the output shaft of the motor (1), and is provided in the flange thereof with three holes (9) for receiving the taper walls (6) therein, respectively, when the compact disk (20) is placed on the turn table (3), the same is centered by the taper boss (5) of the centering hub (4), and the centering hub (4) is moved axially toward the turn table (3) to position the compact disk (20) at a predetermined correct position.

3 Claims, 4 Drawing Figures

DISK INSTALLING DEVICE FOR A DISK PLAYER

BACKGROUND OF THE INVENTION

The present invention relates to a disk installing device for a disk player optical reading system capable of both reproducing images recorded in a video disk and reproducing sound recorded in an audio compact disk.

Japanese Provisonal Utility Model Publication No. 59-142993 (Sept. 25, 1984) discloses a disk installing device for a disk player of the type which is capable of both reproducing images recorded in a video disk and reproducing sound recorded in an audio compact disk. This known disk installing device is equipped with two individual motors for driving a video disk and for driving an audio compact disk, respectively. Accordingly, this known disk installing device is expensive and large in size.

SUMMARY OF THE INVENTION

Accordingly, it is an object of the present invention to provide a disk installing device for a disk player, provided with a single motor for driving both a video disk and a compact disk.

According to the present invention, a disk installing device comprises a turn table both for supporting a video disk and for supporting a compact disk, and a centering hub having in an integral arrangement a centering structure for centering a video disk and a centering structure for centering a compact disk. The centering hub is capable of sinking in the hollow of the turn table in centering a compact disk on the turn table. Accordingly, the flange of the turn table can be formed with a small thickness, and hence the contact of the signal detecting lens of the disk player with the periphery of the flange of the turn table is prevented.

The above and other objects, features and and advantages of the present invention will become more apparent from the following description taken in conjunction with the accompanying drawings.

DESCRIPTION OF THE PREFERRED EMBODIMENT

Figure 1:
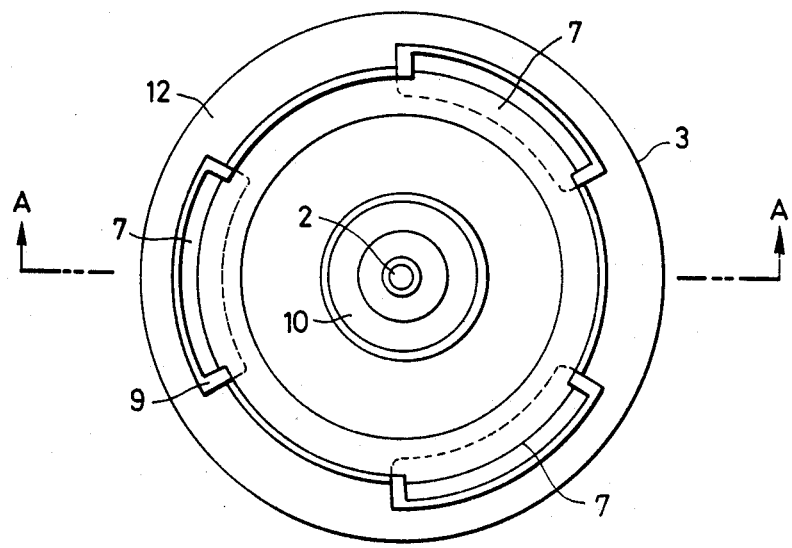
FIG. 1 is a plan view of a disk installing device, in a preferred embodiment, according to the present invention.
Figure 2:
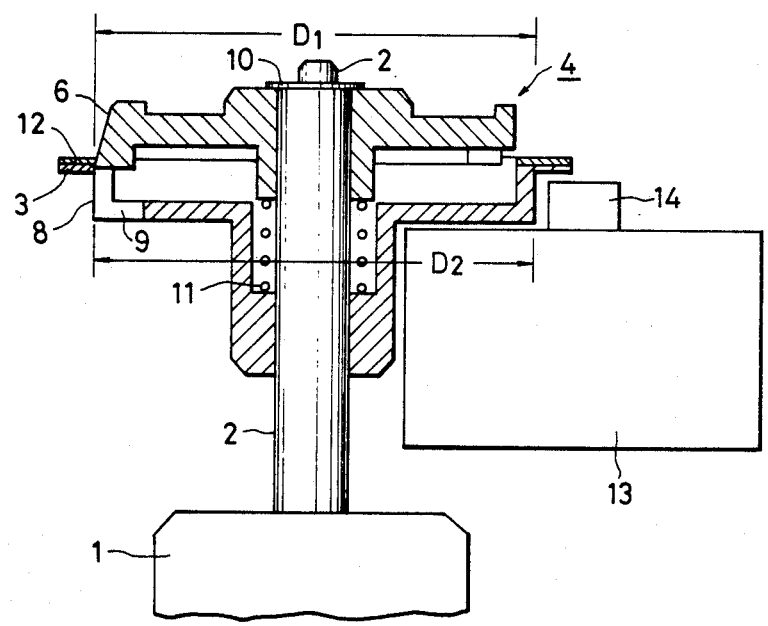
FIG. 2 is a sectional view taken on line A—A in FIG. 1.
Figure 3:
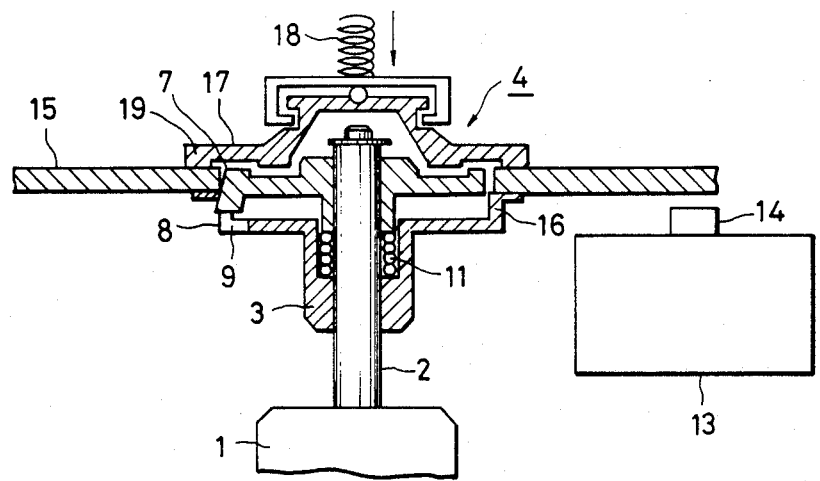
FIG. 3 is a sectional view showing the condition of the disk installing device of FIG. 1 when a video disk is installed.
Figure 4:
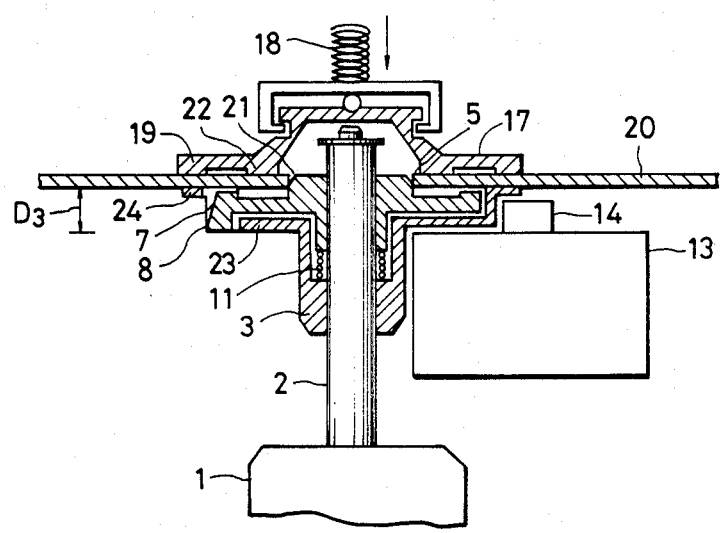
FIG. 4 is a sectional view showing the condition of the disk installing device of FIG. 1 when a compact disk is installed.

Referring to FIGS. 1 and 2, there are shown a driving motor 1, the output shaft 2 of the driving motor 1, a turn table 3 fixed to the output shaft 2, and a centering hub 4 having a taper centering boss 5 for centering a compact disk and segmental, taper centering walls 6 for centering a video disk formed in the outer circumference thereof at equal intervals at three positions. Three holes 9 having a shape corresponding to that of the segmental, taper centering walls 6 are formed in the peripheral portion of the flange of the turn table 3, to receive the taper centering walls 6, respectively, when a compact disk is placed on the turn table 3. The largest diameter $D_1$ of the taper walls 6 and the outer diameter $D_2$ of the peripheral wall 8 of the turn table 3 are substantially the same. The hub 4 is axially slidably retained on the output shaft 2 by a snap ring 10 and is biased upward by a spring 11 disposed in the boss of the turn table 3. An antislip rubber ring 12 is applied to the upper surface of the disk supporting flange of the turn table 3. In FIGS. 2, 3 and 4, indicated at 13 is a pickup unit and at 14 is an objective lens unit.

Referring to FIG. 3, when a video disk 15 is placed on the disk supporting flange of the turn table 3, the taper walls 6 fit the center hole 16 of the video disk 15 and the spring 11 pushes the centering hub 4 upward to center the video disk 15 on the turn table 3. A clamping member 17 is pressed against the video disk 15 by a spring 18 to hold the video disk 15 between the disk supporting flange of the turn table 3 and the annular peripheral wall 19 of the clamping member 17.

Referring to FIG. 4, when a compact disk 20 is placed on the disk supporting flange of the turn table 3, the taper boss 5 of the centering hub 4 fits the center hole 21 of the compact disk 20. The spring 11 pushes the centering hub 4 upward to center the compact disk 20 on the turn table 3. The clamping member 17 is pressed against the compact disk 20 by the spring 18 to hold the compact disk 20 between the disk supporting flange of the turn table 3 and the annular peripheral wall 19 and annular, inner peripheral wall 22 of the clamping member 17. The inner, peripheral wall 22 prevents the inner circumferential portion of the compact disk 20 from being warped by the taper boss 5 of the centering hub 4 in pressing the compact disk 20 against the turn table 3 and fitting the same on the taper centering boss 5 of the centering hub 4 by means of the clamping member 17 and the spring 18. The centering hub 4 is formed so that the taper centering walls 6 are separated from the compact disk 20 when the compact disk 20 is placed on the turn table 3 and the disk 20 is centered by the taper centering boss 5 of the centering hub 4.

The diameter of the center hole of the video disk is 35 mm. Accordingly, the largest outside diameter $D_1$ of the centering hub 4 is in the neighborhood of 36 mm. The outside diameter of the peripheral wall 8 of the turn table 3 may be 36 mm. In the compact disk, a record starting position is on a circle of 50 mm in diameter, while a lead-in signal is recorded on a circle of 46 mm in diameter. Accordingly, at the start of the recording or the reproducing operations, the objective lens unit 14 must be located so that the optical axis thereof is positioned at least 23 mm (46/2 mm), perferably, 22 mm, apart from the axis of rotation of the turn table 3, namely, from the center of the compact disk. Since the outside diameter of the objective lens unit 14, in general, is about 7 mm, the distance between the center axis of the turn table 3 and the outer surface of the objective lens unit 14 is 18.5 mm when the objective lens unit 14 is located at the starting position. However, since the distance between the axis of rotation of the turn table 3 and the outer surface of the peripheral wall 8 of the turn table 3 is 18 mm, the objective lens unit 14 does not interfere with the turn table 3.

Although the three taper centering walls 6 are formed at equal angular intervals in the centering hub 4 of this embodiment, the number of the taper centering walls 6 is not limited thereto and is optional.

As illustrated in FIG. 4, when the compact disk 20 is installed on the turn table 3, the taper centering walls 6 of the centering hub 4 are received in the holes 9 of the turn table 3. Accordingly, the distance $D_3$ between the upper surface 24 of the flange 16 and the lower surface 23 of the flange 16 of the turn table 3, namely, the thickness of the flange 16 of the turn table 3, may be small, and hence the pickup unit 13 does not come into contact with the turn table 3 when the pickup unit 13 is moved near to the turn table 3.

As apparent from what has been described hereinbefore, according to the present invention, both the video disk and the compact disk can be driven for recording or reproducing operation with a single driving motor. Furthermore, the objective lens unit does not interfere with the turn table even when the compact disk is installed on the turn table for recording or reproducing operation, and the compact disk can be installed and centered on the turn table without being warped.

Although the invention has been described in its preferred form with a certain degree of particularity, it is to be understood that many variations and changes are possible in the invention without departing from the scope and spirit thereof.

What is claimed is:

1. A disk installing device for a disk player adapted to employ both a first disk and a second disk comprising:
   a centering hub axially slidably mounted on the output shaft of a driving motor, and having a plurality of first taper centering parts positioned to fit the center hole of the first disk and formed in the circumference of a flange of said centering hub at regular angular intervals, and a second taper centering part dimensional to fit the center hole of the second disk and having an outside diameter smaller than that of a circle corresponding to the outer circumferences of the first taper centering parts;
   a turn table with a supporting surface fixed to the output shaft of the driving motor and provided with cut-out parts corresponding in position to the first taper centering parts of the centering hub and formed so as to receive the first taper centering parts therein when the second disk is placed on the turn table;
   means having a compression coil spring for axially biasing the centering hub toward the supporting surface of the turn table from one side thereof; and
   a clamping member for pressing the first disk or the second disk toward the supporting surface of the turn table from th other side thereof so that the first disk or the second disk is held firmly by said clamping member and is centered on the turn table by said centering hub.

2. A disk installing device according to claim 1, wherein said turn table has a hollow hub-like central portion in which said cut-out parts are provided, said centering hub being positioned within said hub-like central portion of said turn table with said compression coil spring being disposed therebetween.

3. A disk installing device according to claim 2, wherein the supporting surface of said turn table has a central opening where said hub-like central portion is located, the outer diameter of said centering hub being substantially equal to the diameter of said central opening.

* * * * *